(12) United States Patent
Butz et al.

(10) Patent No.: US 6,213,537 B1
(45) Date of Patent: Apr. 10, 2001

(54) MIRROR TRIM PANEL

(75) Inventors: Andrew R. Butz, Holland; Michael Gard, Allegan; David J. McCarthy; Brent A. Reichard, both of Holland, all of MI (US)

(73) Assignee: Prince Technology Corp, Holland, MI (US)

( * ) Notice: Subject to any disclaimer, the term of this patent is extended or adjusted under 35 U.S.C. 154(b) by 0 days.

(21) Appl. No.: 09/336,664

(22) Filed: Jun. 18, 1999

(51) Int. Cl.[7] .................................................. B60J 1/20
(52) U.S. Cl. .................. 296/152; 296/146.7; 296/146.1; 248/479; 248/487
(58) Field of Search ............................... 296/146.7, 152, 296/146.1; 248/479, 487, 291.1

(56) References Cited

U.S. PATENT DOCUMENTS

| | | | |
|---|---|---|---|
| 3,376,007 | * | 4/1968 | Chesterley .......................... 248/487 |
| 4,368,868 | * | 1/1983 | Urban .................................. 248/479 |
| 4,421,333 | * | 12/1983 | Van Dyke ........................ 248/291.1 |
| 4,747,679 | * | 5/1988 | Beach ................................... 248/479 |
| 4,793,582 | * | 12/1988 | Bronstein ............................ 248/479 |
| 4,844,529 | * | 7/1989 | O'Saben ............................... 248/487 |
| 4,998,812 | * | 3/1991 | Hou ...................................... 248/479 |
| 5,120,015 | * | 6/1992 | Do Espirito Santo ............. 248/479 |
| 5,150,941 | * | 9/1992 | Silzer et al. ......................... 296/152 |
| 5,301,916 | * | 4/1994 | Schmidt et al. .................... 296/152 |
| 5,584,144 | * | 12/1996 | Hisano ............................. 296/146.7 |
| 5,639,054 | * | 6/1997 | Gerndt et al. ....................... 248/479 |
| 5,889,624 | * | 3/1999 | Dickenson ........................... 248/479 |
| 5,893,768 | * | 4/1999 | Gawron et al. ..................... 296/152 |
| 6,062,697 | * | 5/2000 | Bryant et al. ....................... 248/479 |
| 6,069,753 | * | 5/2000 | Sheets ................................. 248/479 |

FOREIGN PATENT DOCUMENTS

2056712 * 5/1979 (DE) .................................... 248/479

* cited by examiner

Primary Examiner—Joseph D. Pape
Assistant Examiner—Kiran Patel
(74) Attorney, Agent, or Firm—Foley & Lardner

(57) ABSTRACT

A mirror trim panel including a cover portion, a primary attachment portion, and a hinge between the cover portion and the primary attachment portion. The hinge allows the mirror trim panel to be secured to the door trim panel and to be lowered into a transit position to improve packaging density and to reduce shipping costs of the door trim panel assembly.

20 Claims, 3 Drawing Sheets

US 6,213,537 B1

MIRROR TRIM PANEL

TECHNICAL FIELD OF THE INVENTION

This invention generally relates to a minor trim panel that secures to a door trim panel and, more particularly, to a mirror trim panel with a hinge that maintains a lowered position during transit and an upright position during use.

BACKGROUND

Mirror trim panels have been widely used for many years to improve the aesthetic appearance of the interior of a vehicle. Although often used successfully, there are several problems and disadvantages with conventional mirror trim panels.

One of the disadvantages is related to the transportation of door trim panel assemblies having mirror trim panels formed as a part of or attached to the door trim panel. Such door trim panel assemblies are packaged and shipped with the mirror trim panel projecting upward from the top forward corner of the door trim panel. This method of packaging and shipping causes the mirror trim panel to be susceptible to damage, as other boxes or loads are placed near the carton containing the mirror trim panel. Furthermore, the size of the carton containing the door trim panel assembly must be greatly increased to accommodate the upward-projecting mirror trim panel, therefor affecting packing density within the transporter. Thus, both packaging and shipping costs are increased significantly, since the number of door trim panel assemblies which are transported is quite substantial, and each of these assemblies requires a larger carton to accommodate the mirror trim panel.

Another disadvantage is the method used to hold mirror trim panels in place. If the door trim panel is not formed with an integral mirror trim panel, the mirror trim panel must be separately attached to the sheet metal of the vehicle door. The space available for separate attachment, and alignment features to improve quality, is limited in the mirror attachment area. As a result, the attachment or locating provisions are at times less adequate than desired. Further, a separate mirror trim panel requires additional components within the final assembly plant, and also requires added assembly labor at the final assembly plant.

SUMMARY OF THE INVENTION

Accordingly, this invention provides for a mirror trim panel that overcomes the problems and disadvantages of the conventional techniques in the art. The present invention provides for a mirror trim panel that improves packaging density and reduces shipping cost of the door trim panel assembly. The present invention also provides for a mirror trim panel which attains a higher degree of quality and reliability.

Briefly, the mirror trim panel of the present invention includes a cover portion, a primary attachment portion, and a hinge between the cover portion and the primary attachment portion. The hinge allows the mirror trim panel to be secured to the door trim panel and to be lowered into a transit position to improve packaging density and to reduce shipping costs of the door trim panel assembly.

The present invention also utilizes two locating apertures which align the mirror trim panel to the door trim panel thereby improving fit and finish of the system. Further, the mirror trim panel is held in a fixed position relative to the door trim panel which is positively located relative to the vehicle door. Accordingly, the present invention attains a higher degree of quality and reliability than conventional separately attached mirror trim panels.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature, and is in no way intended to limit the invention, or its application, or uses.

Figure 1:
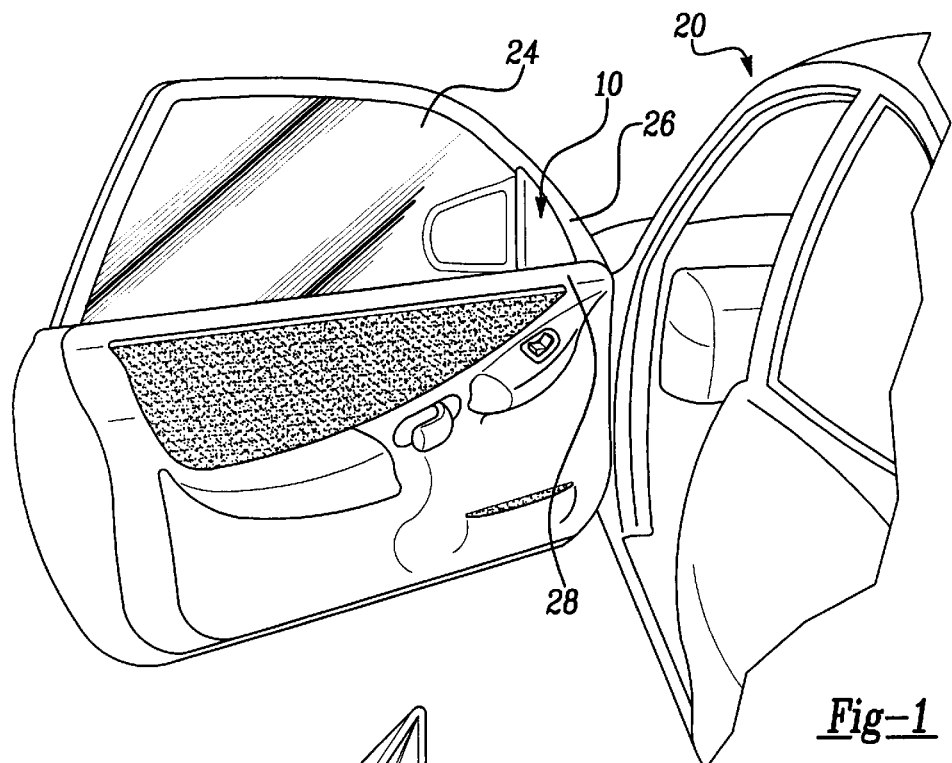
FIG. 1 is a perspective view of a vehicle having a door trim panel incorporating a mirror trim panel, in accordance with the teachings of the present invention.
Figure 2:
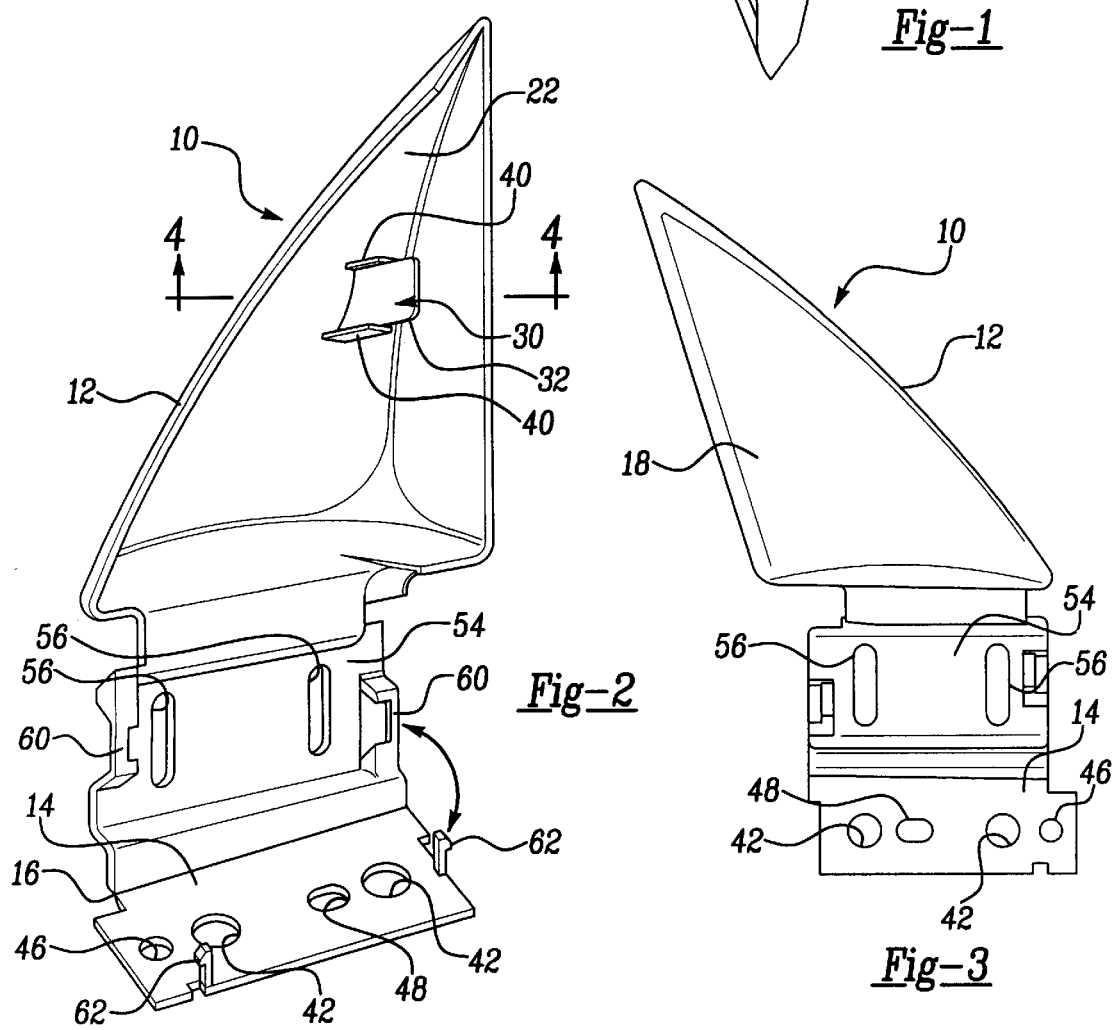
FIG. 2 is a perspective view of the rear surface of the mirror trim panel.
Figure 3:
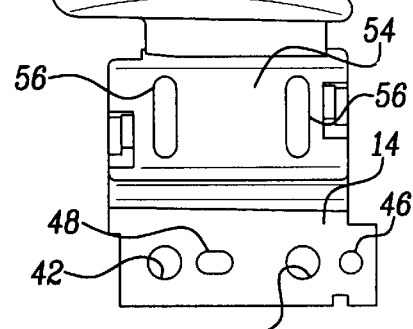
FIG. 3 is a side view of the front surface of the mirror trim panel of FIG. 2.

The mirror trim panel 10 of the present invention is shown in FIGS. 1–3. The mirror trim panel 10 generally includes a cover portion 12, a primary attachment portion 14, and a reduced portion acting as a hinge 16.

Figure 4:
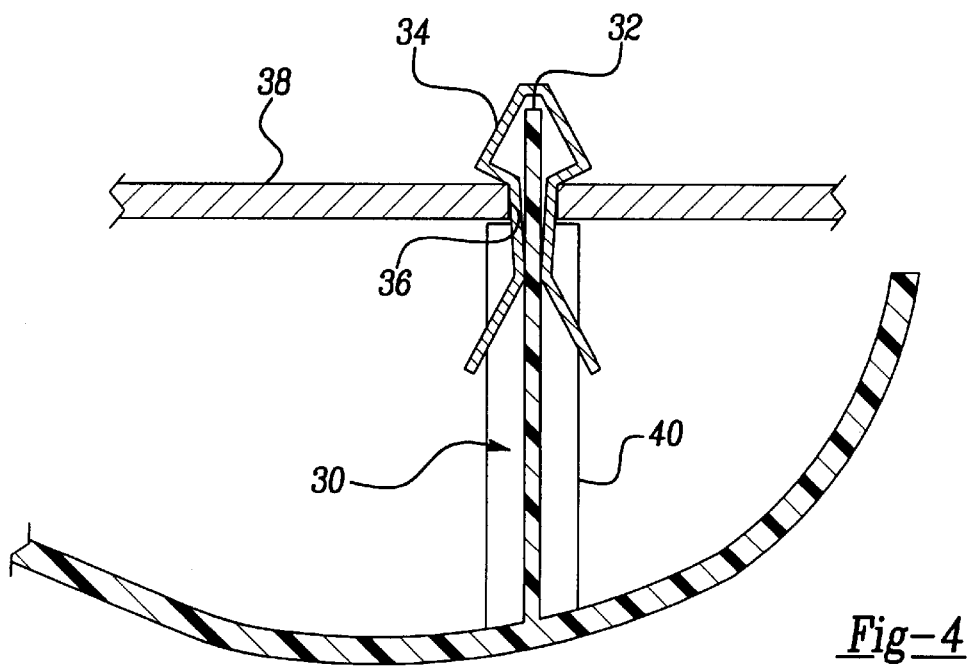
FIG. 4 is a sectional view taken along Line 4–4 in FIG. 2, showing the retaining clip structure of the present invention.
Figure 5:
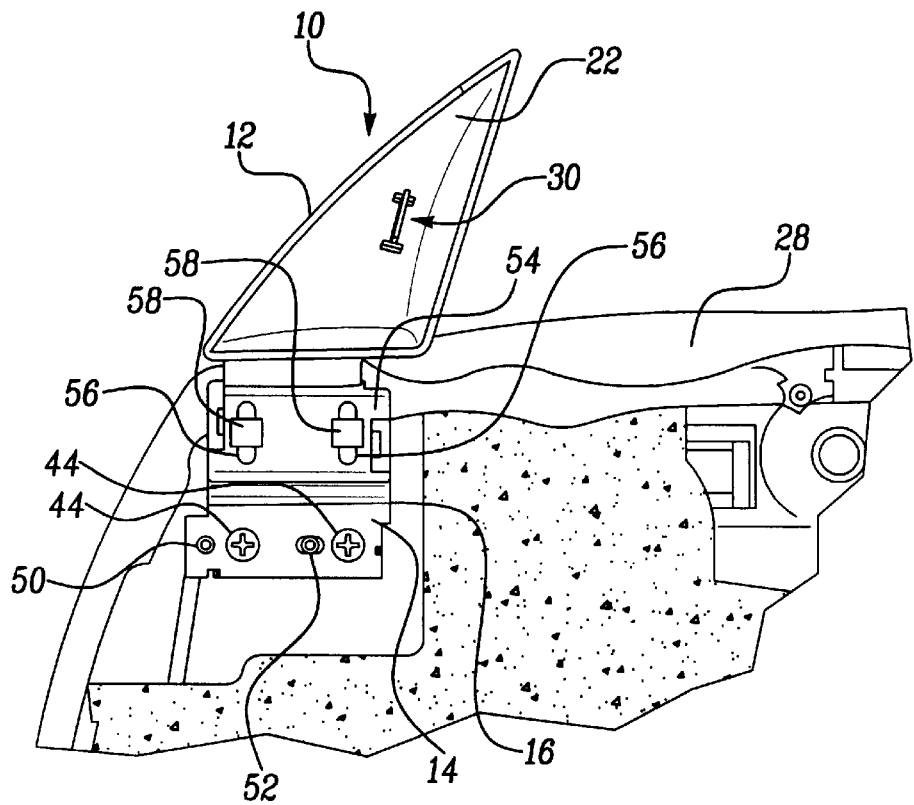
FIG. 5 is a side view of the rear surface of the mirror trim panel in the use position and secured to a door trim panel.

As shown in FIGS. 1–3, the cover portion 12 is a generally triangular-shaped, three-dimensional structure, that includes an aesthetically pleasing front side 18 directed toward the interior of a vehicle 20, and a rear side 22 directed toward the exterior of the vehicle 20. The front side 18 of the cover portion 12 functions to cover, in an aesthetically pleasing manner, the corner of the door, that which is typically not covered by the glass window 24, the door frame 26, or the door trim panel 28. In the preferred embodiment of the present invention, a retention device 30 projects outward from the rear side 22 of the cover portion 12. The retention device 30 functions to retain the cover portion 12 in an upright position. The retention device 30 includes a tab 32 extending from the rear side 22 to engage a clip 34 as shown in FIG. 4. The clip 34 secures the tab 32 and engages an aperture 36 in the sheet metal 38 of the door. The retention device 30 has shoulders 40 which rest against the sheet metal 38 of the door to control the inboard/outboard location of the cover portion 12 and to provide resistance against the clip 34 to securely retain the cover portion 12.

As shown in FIGS. 2, 3, 5, and 6, the primary attachment portion 14 includes two apertures 42 which are adapted to receive fasteners 44 used to secure a mirror trim panel 10 to the door trim panel 28. The primary attachment portion 14 functions to provide a substantially flat surface to attach the mirror trim panel 10 to the door trim panel 28. Fasteners 44 can include, but are not limited to, screws, rivets, bolts, and upstanding bosses for sonic welding or heat staking. The primary attachment portion 14 further includes a circular primary locating aperture 46 and an elongated secondary locating aperture 48 which are placed over a primary locating pin 50 and a secondary locating pin 52 projecting from the door trim panel 28. The locating apertures 46 and 48, together with the locating pins 50 and 52, function to align the primary attachment portion 14 and the door trim panel 28. Once the primary attachment portion 14 is aligned by the intersection of the locating apertures 46 and 48 with the locating pins 50 and 52, respectively, the fasteners 44 attach the mirror trim panel 10 to the door trim panel 28. In alternative embodiments of the present invention, the number and shape of the various apertures, as well as the number or type of fastening clips, may vary to conform to the requirements of the particular door trim panel.

Figure 6:
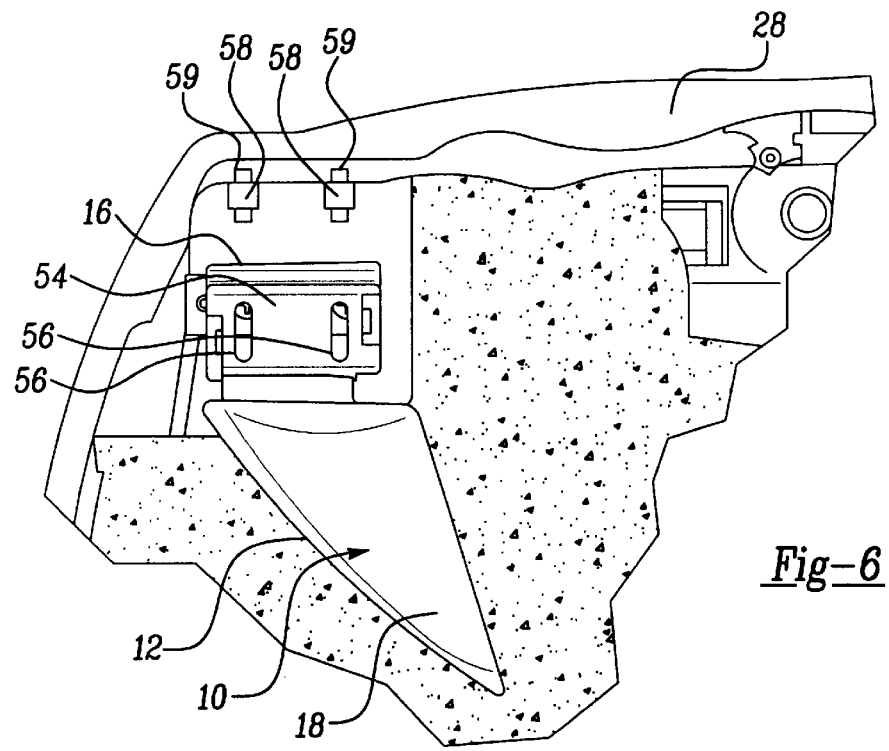
FIG. 6 is a side view of the mirror trim panel of FIG. 5 in the transit position.

In the preferred embodiment of the present invention, a substantially flat secondary attachment portion 54 is located between the cover portion 12 and the primary attachment portion 14. The hinge 16 divides the primary attachment portion 14 and the secondary attachment portion 54. The secondary attachment portion 54 includes two vertically elongated slots 56 which are adapted to engage two clips 58, fastened to ribs 59 projecting from the door trim panel 28, when the mirror trim panel 10 is in the upright position. In the preferred embodiment, the clips 58 are identical to the clip 34. Alternative embodiments of the present invention may vary the number and shape of the slots and clips to conform to the requirements of the particular door trim panel. The secondary attachment portion 54 further includes two elevated receiving apertures 60 which are adapted to engage fastening hooks 62 of the primary attachment portion 14 when the mirror trim panel is in the transit position, as shown in FIG. 6.

When in the transit position, the fastening hooks 62 of the primary attachment portion 14 are temporarily fastened to the receiving apertures 60 of the secondary attachment portion 54. This configuration leads to advantages during shipping of the door trim panel assembly. First, the cover portion 12 of the mirror trim panel 10 is held securely in place so that the possibility of damage to the mirror trim panel 10 during transit is reduced. Second, when fastened in this transit position, the cover portion 12 does not project above the top of the door trim panel 28, thereby allowing the door trim panel assembly (with the mirror trim panel 10) to be packaged in a significantly smaller carton than door trim panels having integrally formed mirror trim panels. The ability to use a smaller carton significantly reduces both packaging and shipping costs, thus yielding a great advantage over previous methods of shipping door trim panel assemblies with the mirror trim panel projecting upward from the door trim panel.

Once the door trim panel incorporating the present invention is received at the assembly plant, the door trim panel is removed from the shipping carton and the cover portion 12 is rotated about the hinge 16 to the use position. When rotated to the use position, the slots 56 engage the two clips 58 that project from the door trim panel 28, thereby securing the cover portion 12 in the upright use position.

Figure 7:
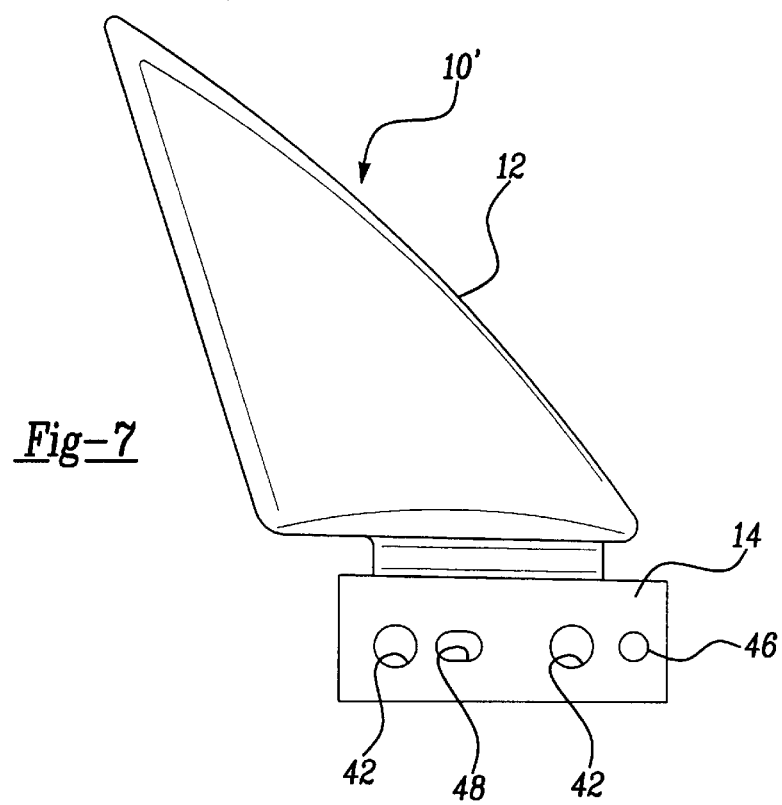
FIG. 7 is a side view of an alternate embodiment of the mirror trim panel.

As shown in FIG. 7, an alternate embodiment of the mirror trim panel 10 eliminates the secondary attachment portion 54 and locates the hinge 16 between the cover portion 12 and the primary attachment portion 14. Effectively, in this embodiment, the cover portion 12 is secured to the sheet metal 38 of the door for an upper attachment of the system, and the primary attachment portion 14 is secured to the door trim panel 28. While some degree of control is lost, particularly inboard/outboard relation between the mirror trim panel and the door trim panel, a reduced number of clip fasteners and material can be achieved.

For positioning the mirror trim panel 10 in the transit position, the clip 34 used to secure the cover portion 12 to the sheet metal 38 of the door can be temporarily used to secure the cover portion 12 to a receiving formation (not shown) on the primary attachment portion 14 or on the door trim panel 28. While the alternate embodiment does not provide as robust a design as the preferred embodiment, the cost and weight reductions achieved may offset any deficiencies (either perceived or actual).

The foregoing discussion discloses and describes a preferred embodiment of the present invention. One skilled in the art will readily recognize from such discussion, and from the accompanying drawings and claims, that various changes and modifications can be made to the invention without departing from the true spirit and fair scope of the invention as defined in the following claims.

What is claimed is:

1. A mirror trim panel, comprising:
   a cover portion;
   a primary attachment portion; and
   a reduced portion acting as a hinge between said cover portion and said primary attachment portion, wherein said cover portion is rotatable downwardly toward said primary attachment portion about said reduced portion placing said mirror trim panel in a transit position.

2. The mirror trim panel of claim 1, wherein said primary attachment portion defines an aperture adapted to receive a fastener.

3. The mirror trim panel of claim 1 further comprising a secondary attachment portion located between said cover portion and said primary attachment portion.

4. The mirror trim panel of claim 3, wherein said secondary attachment portion defines an aperture.

5. A mirror trim panel, comprising:
   a cover portion;
   a primary attachment portion;
   a reduced portion acting as a hinge between said cover portion and said primary attachment portion; and
   a secondary attachment portion located between said cover portion and said primary attachment portion, wherein said secondary attachment portion defines an aperture and said aperture in said secondary attachment portion is adapted to engage an attachment clip of a vehicle when said hinge is in an open configuration, thereby placing said mirror trim panel in a use position.

6. The primary trim panel of claim 3 further comprising a fastening device to temporarily fasten said primary attachment portion to said secondary attachment portion when said hinge is in a closed configuration, thereby placing said mirror trim panel in a transit position.

7. The mirror trim panel of claim 1, wherein said primary attachment portion further comprises a locating aperture, wherein said locating aperture aligns said primary attachment portion relative to a vehicle.

8. The mirror trim panel of claim 1, wherein said mirror trim panel is constructed from a light weight plastic material.

9. The mirror trim panel of claim 1, wherein said cover portion includes a retention device to receive a retaining clip, thereby allowing said mirror trim panel to remain stationary when said mirror trim panel is in a use position.

10. A mirror trim panel, comprising:
   a cover portion;
   a primary attachment portion; and
   a reduced portion acting as a hinge between said cover portion and said primary attachment portion wherein said cover portion includes a retention device to receive a retaining clip, thereby allowing said mirror trim panel to remain stationary when said mirror trim panel is in a use position;

wherein said retention device is a tab which engages the retaining clip.

11. The mirror trim panel of claim 10, wherein said retention device includes shoulders which limit the depth to which said tab may engage the retaining clip.

12. A door trim panel assembly, comprising:

a door trim panel; and a mirror trim panel secured to said door trim panel, said mirror trim panel including a cover portion, a primary attachment portion, and a reduced portion acting as a hinge between said cover portion and said primary attachment portion.

13. The door trim panel assembly of claim 12 further comprising a secondary attachment portion located between said cover portion and said primary attachment portion.

14. The door trim panel assembly of claim 13, wherein said door trim panel includes an attachment clip to engage an aperture defined by said secondary attachment portion when said hinge is in an open configuration, thereby placing said mirror trim panel in a use position.

15. The door trim panel assembly of claim 13 further comprising a fastening device to temporarily fasten said primary attachment portion to said secondary attachment portion when said hinge is in a closed configuration, thereby placing said mirror trim panel in a transit position.

16. The door trim panel assembly of claim 12, wherein said primary attachment portion defines an aperture adapted to receive a fastener to secure said mirror trim panel to said door trim panel.

17. The door trim panel assembly of claim 12, wherein said door trim panel includes a locating pin, such that a locating aperture defined by said primary attachment portion may be placed over said locating pin to align said primary attachment portion relative to the vehicle.

18. The door trim panel assembly of claim 12, wherein said door trim panel assembly is constructed from a light weight plastic material.

19. A door trim panel assembly, comprising:

a door trim panel having an upstanding primary locating pin, an upstanding secondary locating pin, and an attachment clip; and a mirror trim panel secured to said door trim panel, said mirror trim panel including a cover portion and a body, said body having a reduced section acting as a hinge and dividing said body into a first portion and a second portion, said first portion having an aperture adapted to receive a fastening means for securing said body to said door trim panel, a primary locating aperture coordinated with said primary locating pin, a secondary locating aperture coordinated with said secondary locating pin, and a fastening clip, said second portion proximate to said cover portion and having an attachment slot adapted to engage said attachment clip when said hinge is in an open configuration when said cover portion is in a use position, and a receiving aperture adapted to engage said fastening clip when said hinge is in a folded configuration when said cover portion is in a transit position.

20. The door trim assembly of claim 19, wherein said cover portion of said mirror trim panel includes a retention device which receives a retaining clip, thereby allowing said mirror trim panel to remain stationary when said mirror trim panel is in the use position.

* * * * *